United States Patent
Hayashi et al.

(10) Patent No.: US 11,316,228 B2
(45) Date of Patent: Apr. 26, 2022

(54) BATTERY PACK

(71) Applicant: MAKITA CORPORATION, Anjo (JP)

(72) Inventors: Hidekazu Hayashi, Anjo (JP); Hideyuki Taga, Anjo (JP)

(73) Assignee: MAKITA CORPORATION, Anjo (JP)

(*) Notice: Subject to any disclaimer, the term of this patent is extended or adjusted under 35 U.S.C. 154(b) by 368 days.

(21) Appl. No.: 15/371,428

(22) Filed: Dec. 7, 2016

(65) Prior Publication Data

US 2017/0187010 A1 Jun. 29, 2017

(30) Foreign Application Priority Data

Dec. 25, 2015 (JP) .............................. JP2015-254789

(51) Int. Cl.
| | |
|---|---|
| *H01M 2/20* | (2006.01) |
| *H01M 50/213* | (2021.01) |
| *H01M 50/116* | (2021.01) |
| *H01M 50/502* | (2021.01) |
| *H01M 10/04* | (2006.01) |
| *H01M 10/0525* | (2010.01) |

(52) U.S. Cl.
CPC ..... *H01M 50/213* (2021.01); *H01M 10/0422* (2013.01); *H01M 50/116* (2021.01); *H01M 50/502* (2021.01); *H01M 10/0525* (2013.01); *H01M 2220/30* (2013.01)

(58) Field of Classification Search
CPC .... H01M 2/105; H01M 2/204; H01M 2/0277; H01M 10/0422; H01M 10/0525; H01M 2220/30; B25F 5/00; H02J 7/0014

USPC .............................................. 29/623.1–623.5
See application file for complete search history.

(56) References Cited

U.S. PATENT DOCUMENTS

| | | | |
|---|---|---|---|
| 2005/0280393 A1* | 12/2005 | Feldmann | ................. B25F 5/00 320/114 |
| 2012/0045665 A1 | 2/2012 | Park | |
| 2012/0082887 A1* | 4/2012 | Ninomiya | ................ H01G 9/08 429/159 |
| 2012/0129042 A1 | 5/2012 | Kurahashi | |

(Continued)

FOREIGN PATENT DOCUMENTS

| | | |
|---|---|---|
| CN | 202601769 U | 12/2012 |
| CN | 103201875 A | 7/2013 |

(Continued)

OTHER PUBLICATIONS

Machine Translation WO2007/034703A1 (Year: 2007).*

(Continued)

*Primary Examiner* — Victoria H Lynch
(74) *Attorney, Agent, or Firm* — J-Tek Law PLLC; Jeffrey D. Tekanic; Scott T. Wakeman (57) ABSTRACT

A battery pack includes a battery cell case, a plurality of battery cells accommodated in the battery cell case, a plurality of lead plates connected to the battery cells, arranged on a same side surface of the battery cell case, and arranged to be separated from each other, and one or more insulation sheets. A first insulation sheet included in the one or more insulation sheets is adhered to a surface of a first lead plate so as to cover the first lead plate at least partially and not to cover lead plates other than the first lead plate.

23 Claims, 10 Drawing Sheets

(56) References Cited

U.S. PATENT DOCUMENTS

2013/0224539 A1* 8/2013 Hayashi .............. H01M 50/60
                     429/82
2014/0017519 A1  1/2014 Park
2014/0356672 A1* 12/2014 Lee ................... H01M 2/1061
                     429/94

FOREIGN PATENT DOCUMENTS

| | | |
|---|---|---|
| CN | 203423236 U | 2/2014 |
| JP | 2006100146 A | 4/2006 |
| JP | 2006100147 A | 4/2006 |
| JP | 2012043790 A | 3/2012 |
| JP | 2012253019 A | 12/2012 |
| WO | WO-2007034703 A1 * | 3/2007 ........ H01M 10/4207 |

OTHER PUBLICATIONS

English translation of the Search Report dated Jul. 24, 2019 in counterpart Japanese application No. 2015-254789.

Office Action from the Japanese Patent Office dated Jul. 30, 2019 in counterpart Japanese application No. 2015-254789, and translation thereof.

Office Action and Search Report from the Chinese Patent Office dated Apr. 16, 2020 in related Chinese application No. 201610881647. 9, and machine translation thereof.

\* cited by examiner

BATTERY PACK

CROSS-REFERENCE TO RELATED APPLICATION

This application claims priority to Japanese patent application No. 2015-254789 filed on Dec. 25, 2015, the contents of which are fully incorporated herein by reference.

TECHNICAL FIELD

The present teachings generally relate to a battery pack, e.g., for a power tool.

RELATED ART

Japanese Patent Application Publication No. 2012-43790 and its family member U.S. 2012/0045665 disclose a battery pack that includes: a battery cell holder case; a plurality of battery cells accommodated in the battery cell holder case; a plurality of connection tabs connected to respective groups of the battery cells, the connection tabs being spatially separated from each other; and one insulating sheet that is adhered to the outer surfaces of the plurality of connection tabs on one side of the battery cells so as to straddle all of the connection tabs on the one side of the battery cells.

In the following description, the term "lead plate" will be used in a manner that is synonymous with "connection tabs". It is noted that the term "lead" is being used in the sense of an "electrical lead" and not in the sense of the element lead (Pb). Thus, lead plates may be made of any conductive metal or alloy, such as copper, copper alloy, aluminum, aluminum alloy, etc.

SUMMARY OF THE INVENTION

In a battery pack of the above-described type, water, foreign matter, or the like may enter into the battery pack and come into contact with the surfaces of the lead plates (connection tabs) that electrically connect the battery cells, thereby causing a short-circuit. For example, any such water that contacts the surfaces of the lead plates can dissolve or elute conductive compounds in the lead plates and cause adjacent lead plates to short-circuit via the conductive compounds dissolved in the water. In the above-described known battery pack, the insulating sheet is adhered to the entire surfaces of the lead plates (connection tabs) with the goal of preventing a short circuit between the adjacent lead plates in case water, foreign matter, or the like has entered into the battery pack. Specifically, one insulating sheet covers all of the surfaces of the plurality of lead plates on one side of the battery cells to block water, foreign matter, etc. from contacting the surfaces of the lead plates, thereby reducing the likelihood of a short circuit between adjacent lead plates. It is noted that, in the above-described known battery pack, the lead plates (connection tabs) are arranged so as to be physically or spatially separated (isolated) from each other. Therefore, when one insulating sheet is adhered to all of the lead plates on one side of the battery cells, the one insulating sheet straddles the gap(s) between adjacent lead plates. In this design, the insulating sheet might start to peel off at the gap(s) between adjacent lead plates. In this circumstance, any water, foreign matter, or the like that has entered into the battery pack may create an electrical connection between adjacent lead plates, thereby leading to a short-circuit of adjacent lead plates.

In view of these circumstances, a battery pack according to the present teachings may preferably comprise a battery cell case, a plurality of battery cells accommodated in the battery cell case, a plurality of lead plates connected to the battery cells, arranged on a same side surface of the battery cell case, and arranged to be separated from each other; and one or more insulation sheets. A first insulation sheet included in the one or more insulation sheets is adhered to a surface of a first lead plate so as to cover the first lead plate at least partially and not to cover lead plates other than the first lead plate.

In a battery pack according to the present teachings, the first electric insulation sheet may be adhered, e.g., to only the surface of the first lead plate, without covering the surfaces of adjacent lead plates. In other words, the first electric insulation sheet is not adhered to the surfaces of two or more of the lead plates in a straddling manner. In such an embodiment of the present teachings the first electric insulation sheet can be appropriately (more reliably or durably) adhered to the surface of the first lead plate, such that the likelihood of the first electric insulation sheet peeling off from the first lead plate can be prevented or reduced. It is thereby possible to better prevent any water, foreign matter, etc. present within the battery pack from contacting the surface of the first lead plate covered by the first electric insulation sheet. Consequently, it is possible to reduce the likelihood that a short circuit between the first lead plate covered by the first electric insulation sheet and an adjacent lead plate will occur in the event that any water, foreign matter or the like has entered into the battery pack.

DETAILED DESCRIPTION OF THE INVENTION

In some embodiments of the battery pack according to the present teachings, the plurality of lead plates may comprise the first lead plate and a second lead plate that is adjacent to the first lead plate and is not covered by an electric insulation sheet. An end (edge portion) of the first lead plate on the side adjacent to the second plate is at least partially covered by the first electric insulation sheet.

If water, foreign matter, etc. is present inside the battery pack, a short circuit between adjacent lead plates is more likely to occur where the separation distance between an exposed portion of a surface of one lead plate and an exposed portion of a surface of an adjacent lead plate is shorter. Herein, the term "exposed portion" refers to a portion of the surface of the lead plate that is not covered by an electric insulation sheet. According to the above-described battery pack, the separation distance between an exposed portion of the first lead plate that has at least one end (edge portion) covered by the first electric insulation sheet and an exposed portion of a second lead plate adjacent to the first lead plate can be increased, thereby preventing or reducing the likelihood of a short circuit between the first lead plate and the second lead plate if any water, foreign matter, or the like is present in the battery pack.

In some embodiments of the battery pack according to the present teachings, the first lead plate may be only partially covered by the first electric insulation sheet.

According to such a battery pack, the first electric insulation sheet is partially adhered to the surface of the first lead plate, which serves to increase the separation distance between exposed portions of the first and second lead plates, as compared to a design in which no electric insulation sheet is adhered to the surface of the first lead plate, thereby reducing the likelihood of a short-circuit. Moreover, the amount of electric insulation sheet used to cover the lead plate(s) can be reduced as compared to embodiments, in which both the first and second lead plates are covered by the electric insulation sheets, or the first lead plate is entirely covered by the electric insulation sheet.

In some embodiments of the battery pack according to the present teachings, the plurality of lead plates may further comprise a third lead plate adjacent to the first lead plate. In such embodiments, the first lead plate may be arranged between the second lead plate and the third lead plate, the third lead plate is not covered by any electric insulation sheet, and the first lead plate is entirely covered by the first electric insulation sheet.

Such a battery pack also prevents or reduces the likelihood of a short-circuit if any water, foreign matter, or the like has entered into the battery pack by blocking contact thereof with the surface of the first lead plate. Moreover, the amount of the electric insulation sheet used to cover the lead plate(s) can be reduced as compared to designs in which the first lead plate is not covered by the electric insulation sheet and both the second and third lead plates are covered by electric insulation sheets.

In some embodiments of the battery pack according to the present teachings, the first electric insulation sheet may be adhered to the surface of the first lead plate and also to an adjacent portion of the surface of the battery cell case.

According to such a battery pack, the first electric insulation sheet adhered to the surface of the first lead plate is also adhered to a portion of the surface of the battery cell case that is adjacent to the end (edge portion) of the first lead plate. In such a design, even if a portion of the first electric insulation sheet adhered to the surface of the battery cell case peels off, it is unlikely that a portion of the first electric insulation sheet adhered to the end (edge portion) of the first lead plate will also peel off. The electric insulation sheet adhered to the end of the first lead plate can thereby be made less likely to peel off. Consequently, even if a portion of the first electric insulation sheet adhered to the surface of the battery cell case peels off, any water, foreign matter, etc. present in the battery pack can still be effectively blocked from contacting the lead plate.

EMBODIMENT

Figure 2:
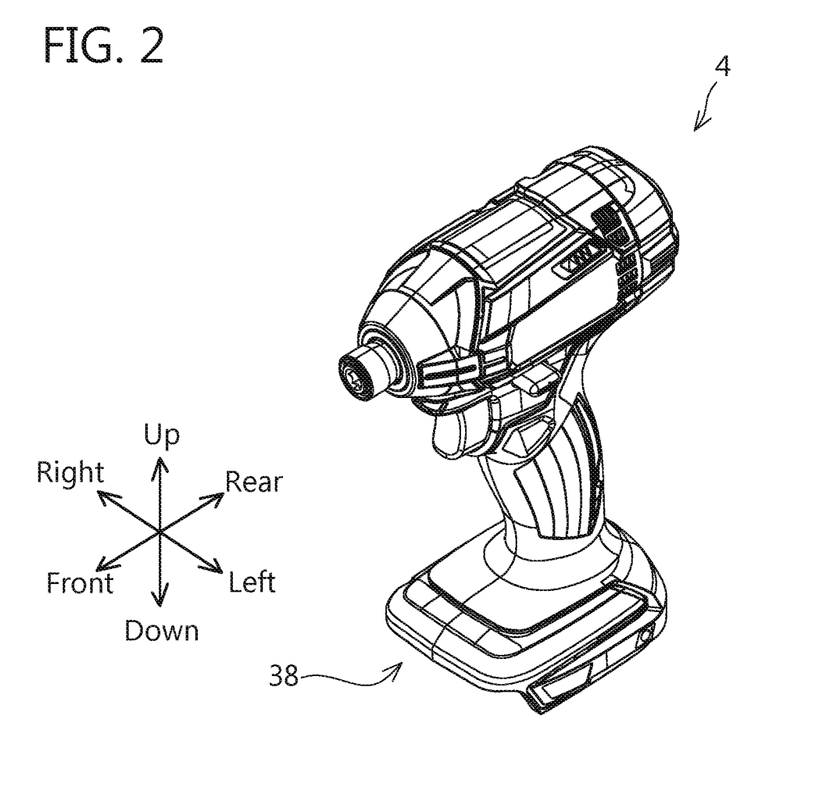
FIG. 2 is a perspective view of an electric power tool that can be powered with battery packs according to the present teachings.
Figure 3:
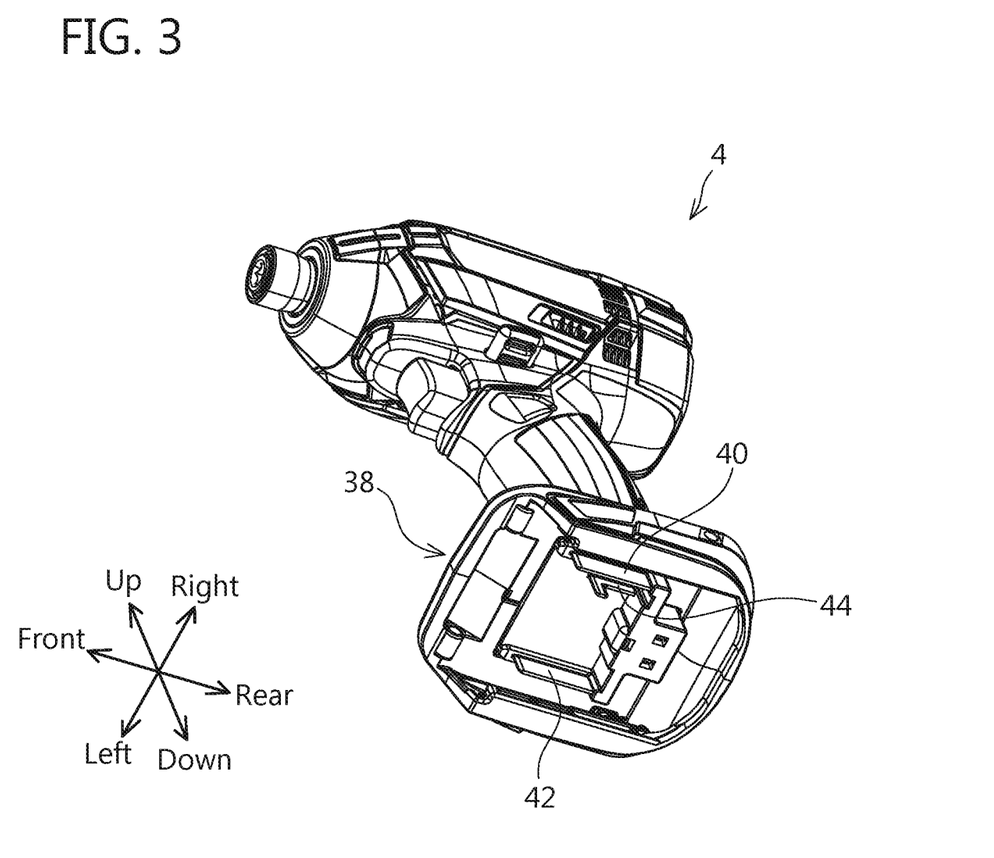
FIG. 3 is a lower, perspective view of the electric power tool of FIG. 2.

A battery pack 2 according to a first embodiment of the present teachings will hereinafter be described with reference to the drawings. It is noted that, in FIGS. 4 and 6, lead plates 18*b* and 18*e*, and concave portions 21*b* and 21*e* are shown in long dashed double-dotted lines, for ease of understanding of the description. The battery pack 2 shown in FIG. 1 can be detachably attached to an electric power tool 4 (see FIGS. 2 and 3). FIGS. 2 and 3 illustrate a representative, non-limiting electric power tool 4 according to the present teachings, which is an electric driver-drill. However, it is noted that electric power tools according to the present teachings include, e.g. and without limitation, electric hammer driver-drills, electric impact drivers and impact wrenches, electric screwdrivers, electric jig saws, electric grinders, electric circular saws, electric chainsaws, electric reciprocating saws, electric lawnmowers, electric bush cutters, electric blowers, electric vacuums, and the like. In short, any type of electric power tool that is configured to be driven with current supplied by a battery pack 2 according to the present teachings is intended to fall within the scope of the present teachings. When attached to the electric power tool 4, the battery pack 2 supplies electric current (power) to the electric power tool 4. Moreover, the battery pack 2 can be detachably attached to a charger (not shown). When attached to the charger, the battery pack 2 is supplied with electric current (power) from the charger, thereby recharging it. It is noted that, in the description below, when the battery pack 2 is attached to the electric power tool 4 or the charger, the direction in which the electric power tool 4 or the charger is located with respect to the battery pack 2 is referred to as upward, and the direction opposite therefrom is referred to as downward. Moreover, when the battery pack 2 is to be attached to the electric power tool 4 or the charger, the direction along which the battery pack 2 is slid is referred to as rearward, and when the battery pack 2 is to be detached from the electric power tool 4 or the charger, the direction along which the battery pack 2 is slid is referred to as frontward. In other words, in the description below, the frontward and rearward directions correspond to the sliding directions along which the battery pack 2 is slid against (relative to) the electric power tool 4 or the charger.

The battery pack 2 preferably includes a battery module 6 (see FIG. 4) and an outer case 8 (see FIG. 1) that accommodates the battery module 6. The entirety of the outer case 8 is formed to have an approximately rectangular parallelepiped shape, and is divided into an upper case 10 and a lower case 12. The upper case 10 and the lower case 12 are fixed to each other by one or more fasteners such as bolts or screws.

Figure 4:
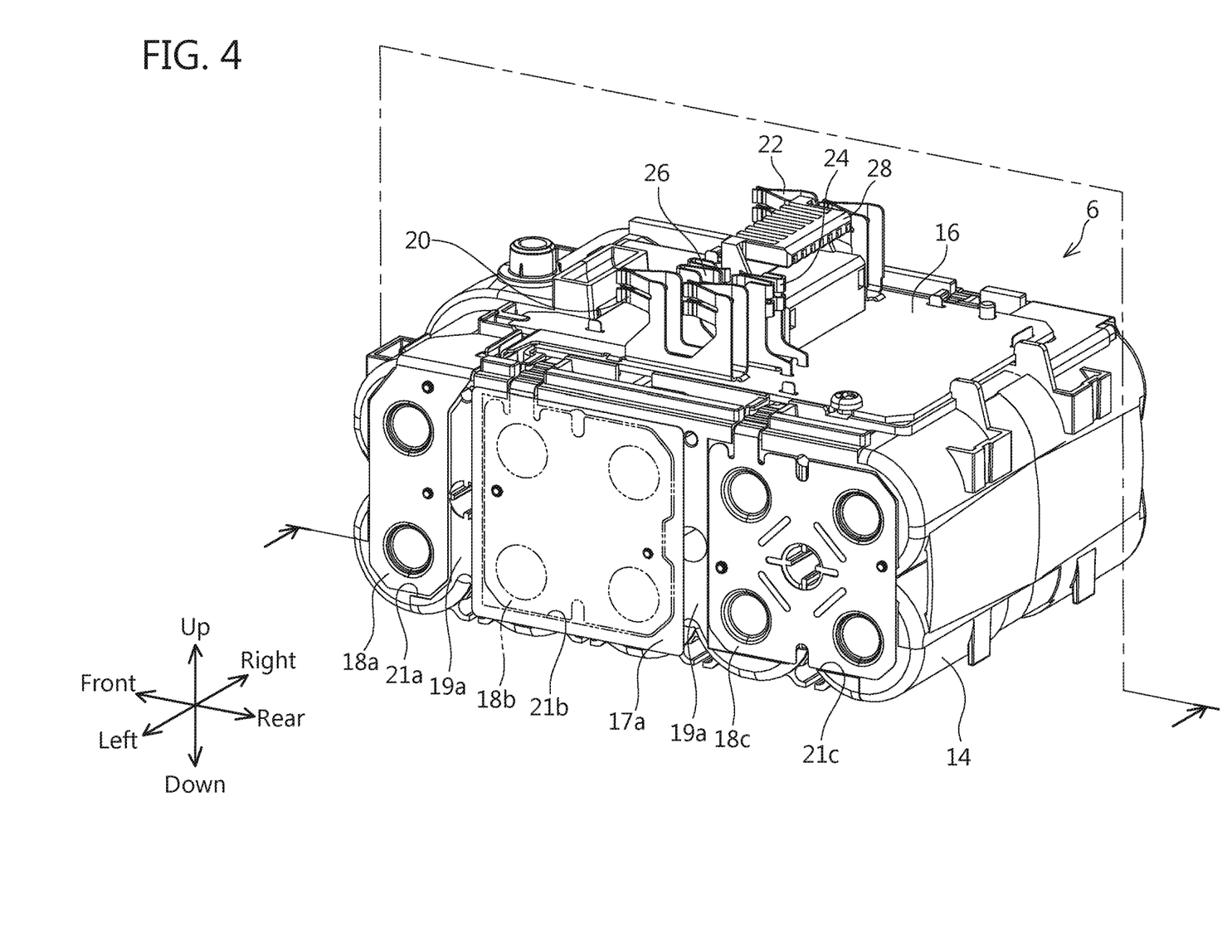
FIG. 4 is a perspective view of a battery module according to an embodiment of the present teachings.
Figure 5:
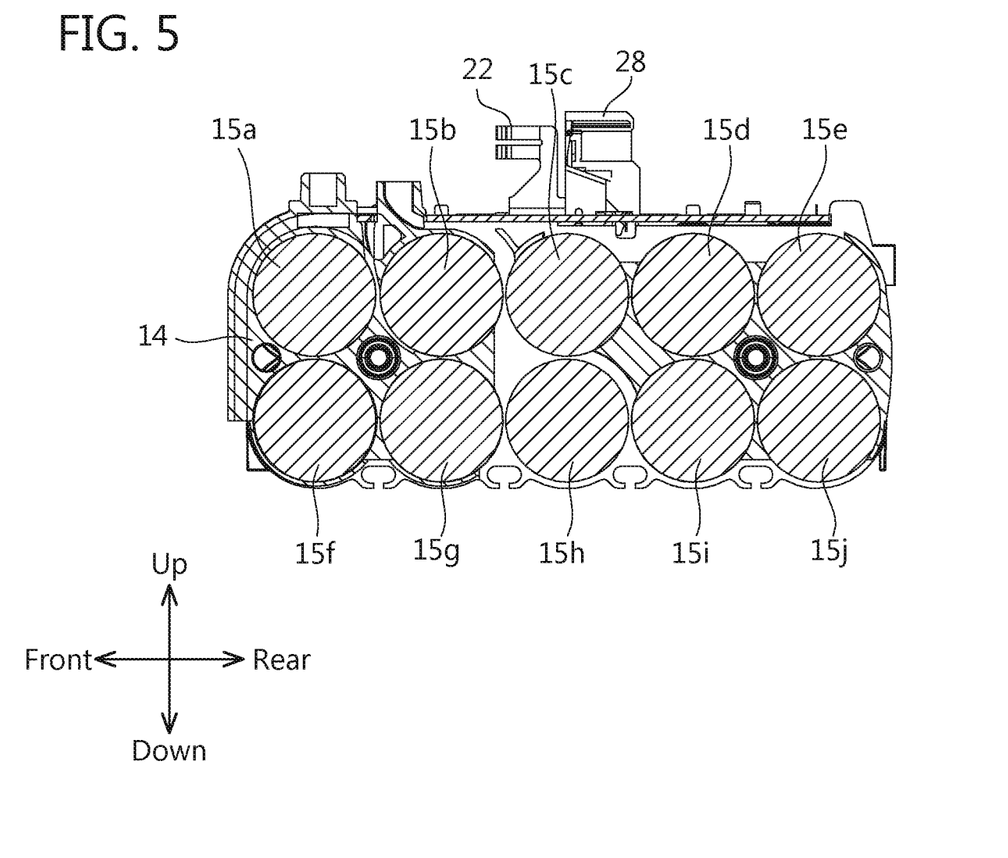
FIG. 5 is a cross-sectional view taken along line V-V in FIG. 4.
Figure 6:
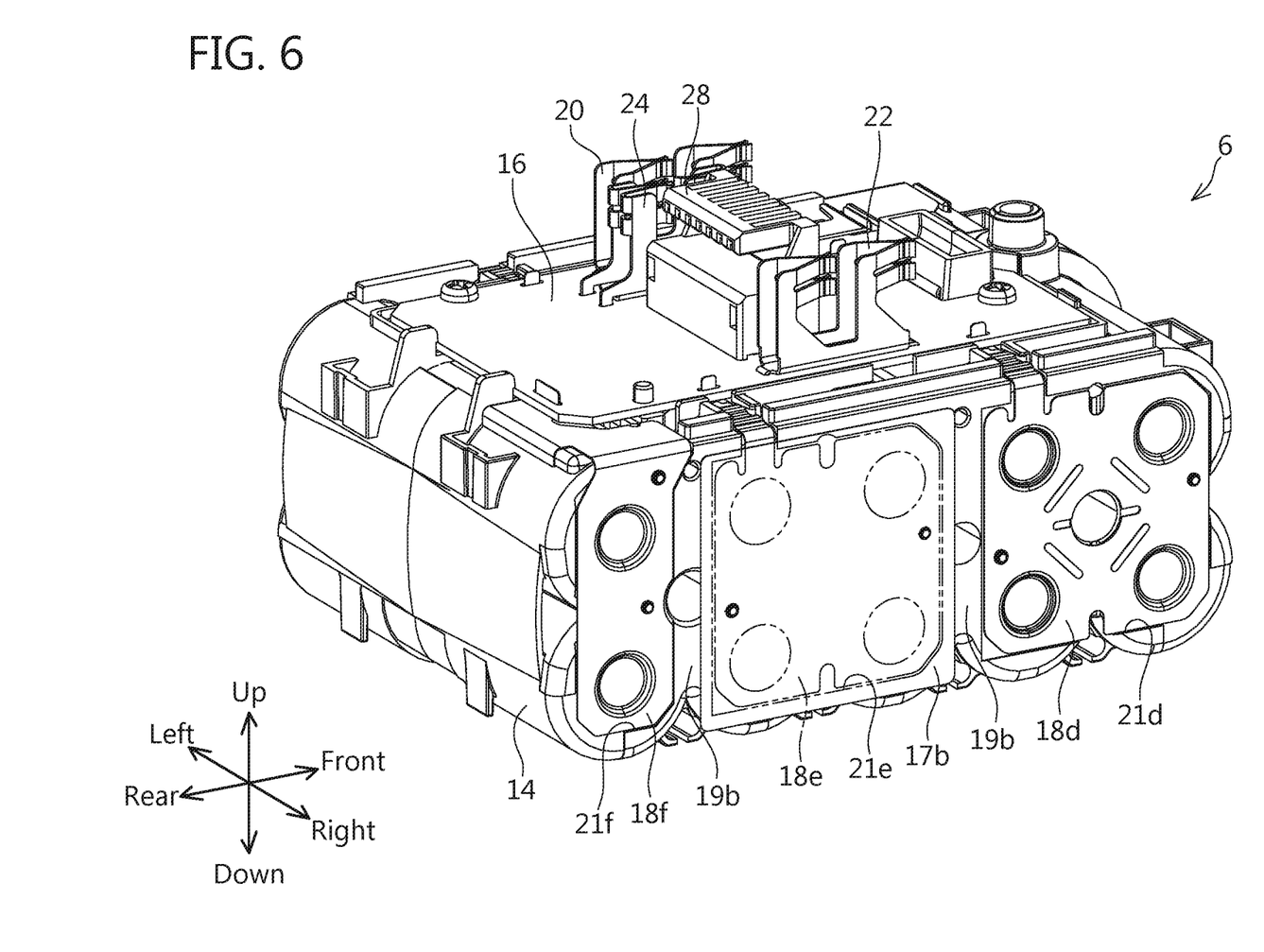
FIG. 6 is another perspective view of the battery module of FIG. 4 from the opposite side.

A first representative battery module 6 according to the present teachings will now be described in further detail with reference to FIGS. 4 to 6. As shown in FIG. 4, the battery module 6 includes a battery cell case (battery cell holder) 14 and a control substrate 16. The battery cell case 14 is composed of an insulating material, such as a resin material. As shown in FIG. 5, the battery cell case 14 accommodates ten battery cells 15*a* to 15*j* in two tiers in the upward-downward direction. It is noted that, if battery cells 15*a* to 15*j* are discussed in the following without making a distinction therebetween, they will be denoted simply as "battery cell 15" or "battery cells 15". In the present embodiment, each battery cell 15 is a cylindrical-shaped, secondary (e.g., lithium-ion) battery cell that has a positive electrode formed at one end, and a negative electrode formed at the other end. Each set of two battery cells 15 that are adjacent in the upward-downward direction is arranged such that the two adjacent battery cells 15 are aligned and oriented in the same direction from the positive electrodes to the negative electrodes. Specifically, each of the sets of battery cells 15a and 15f, battery cells 15b and 15g, battery cells 15c and 15h, battery cells 15d and 15i, and battery cells 15e and 15j are aligned and oriented in the same directions from the positive electrodes to the negative electrodes. Moreover, in the frontward-rearward direction of the battery pack 2, the battery cells 15 are arranged to have mutually-opposite directions from the positive electrodes to the negative electrodes. Specifically, the battery cells 15a, 15c, and 15e are arranged to have the same direction from the positive electrodes to the negative electrodes, respectively, while the battery cells 15b and 15d are arranged to have the direction from the positive electrodes to the negative electrodes, respectively, that is opposite from the direction of the battery cells 15a, 15c, and 15e. The same applies to the arrangement of the battery cells 15f to 15j. The positive electrode and the negative electrode of each of the battery cells 15 are exposed outside of the battery cell case 14. On the left side surface of the battery cell case 14 (see FIG. 4), the ends of the battery cells 15 are respectively connected to lead plates 18a to 18c made of an electrically-conductive metal. On the right side surface of the battery cell case 14 (see FIG. 6), the other ends of the battery cells 15 are respectively connected to lead plates 18d to 18f made of an electrically-conductive metal. As shown in FIG. 4, the lead plates 18a to 18c are arranged to be physically or spatially separated from each other. Therefore, the lead plates 18a to 18c are isolated (insulated) from each other. Furthermore, concave portions 21a to 21c are respectively provided or defined in the left side surface of the battery cell case 14 at positions where the lead plates 18a to 18c are disposed. The outer contours of the concave portions 21a to 21c are slightly larger than the outer contours of the corresponding lead plates 18a to 18c. The lead plates 18a to 18c are respectively disposed in the corresponding concave portions 21a to 21c, such that the surfaces of the lead plates 18a to 18c are approximately flush with the surfaces of gaps 19a between the lead plates 18a to 18c. Moreover, as shown in FIG. 6, the lead plates 18d to 18f are also arranged to be physically or spatially separated from each other, i.e. they are also isolated (insulated) from each other. Moreover, concave portions 21d to 21f are respectively provided or defined in the right side surface of the battery cell case 14 at positions where the lead plates 18d to 18f are disposed. The outer contours of the concave portions 21d to 21f are slightly larger than the outer contours of the corresponding lead plates 18d to 18f. The lead plates 18d to 18f are respectively disposed in the corresponding concave portions 21d to 21f, such that the surfaces of the lead plates 18d to 18f are approximately flush with the surfaces of gaps 19b between the lead plates 18d to 18f.

The battery cells 15 adjacent in the upward-downward direction are electrically connected in parallel by the lead plates 18a to 18f. Specifically, the battery cells 15a and 15f, the battery cells 15b and 15g, the battery cells 15c and 15h, the battery cells 15d and 15i, and the battery cells 15e and 15j are electrically connected in parallel. Moreover, the battery cells 15 adjacent in the frontward-rearward direction are electrically connected in series by the lead plates 18a to 18f. Specifically, the battery cells 15a to 15e are electrically connected in series, and the battery cells 15f to 15j are electrically connected in series.

As shown in FIG. 4, the entire surface of the lead plate 18b, and a portion of the battery cell case 14 adjacent to the lead plate 18b, are covered by an electric insulation paper 17a. The electric insulation paper 17a serves to block any water, foreign matter, etc., which has entered into the battery pack 2, from contacting the surface of the lead plate 18b. It is thereby possible to maintain an insulated state of the lead plates 18a and 18b, and an insulated state of the lead plates 18b and 18c even if water, foreign matter, etc. enters into the battery pack 2, thereby preventing or minimizing the likelihood of a short circuit between the lead plates 18a and 18b, or between the lead plates 18b and 18c.

Similarly, as shown in FIG. 6, the entire surface of the lead plate 18e, and a portion of the battery cell case 14 adjacent to the lead plate 18e, are covered by another electrical insulation paper 17b, thereby blocking any water, foreign matter, etc. from contacting the surface of the lead plate 18e, insulating the lead plate 18e from the lead plates 18d and 18f and preventing or minimizing the likelihood of a short circuit between the lead plates 18d and 18e, or between the lead plates 18e and 18f.

As shown in FIG. 4, the control substrate 16 is arranged (disposed) on top of the battery cell case 14 and extends along a plane orthogonal to the upward-downward direction. The control substrate 16 is fixed to the battery cell case 14 via one or more fasteners such as bolt(s), screw(s), etc.

Provided on an upper surface of the control substrate 16 are a discharge positive terminal 20, a charging/discharge negative terminal 22, a charging positive terminal 24, a discharge inhibition signal terminal 26, and a charge control signal terminal 28. The discharge positive terminal 20 serves as a positive terminal when the battery pack 2 is attached to the electric power tool 4 and electric current (power) is supplied from the battery pack 2 to the electric power tool 4. The charging/discharge negative terminal 22 serves as a negative terminal when the battery pack 2 is attached to the electric power tool 4 and electric current (power) is supplied from the battery pack 2 to the electric power tool 4, and also serves as a negative terminal when the battery pack 2 is attached to the charger and electric current (power) is supplied from the charger to the battery pack 2. The charging positive terminal 24 serves as a positive terminal when the battery pack 2 is attached to the charger and electric current (power) is supplied from the charger to the battery pack 2. The discharge inhibition signal terminal 26 serves to transmit a discharge inhibition signal from the battery pack 2 to the electric power tool 4 when the battery pack 2 attached to the electric power tool 4 becomes excessively discharged. The charge control signal terminal 28 serves to transmit a charge control signal from the battery pack 2 to the charger, when the battery pack 2 is attached to the charger for recharging.

Figure 1:
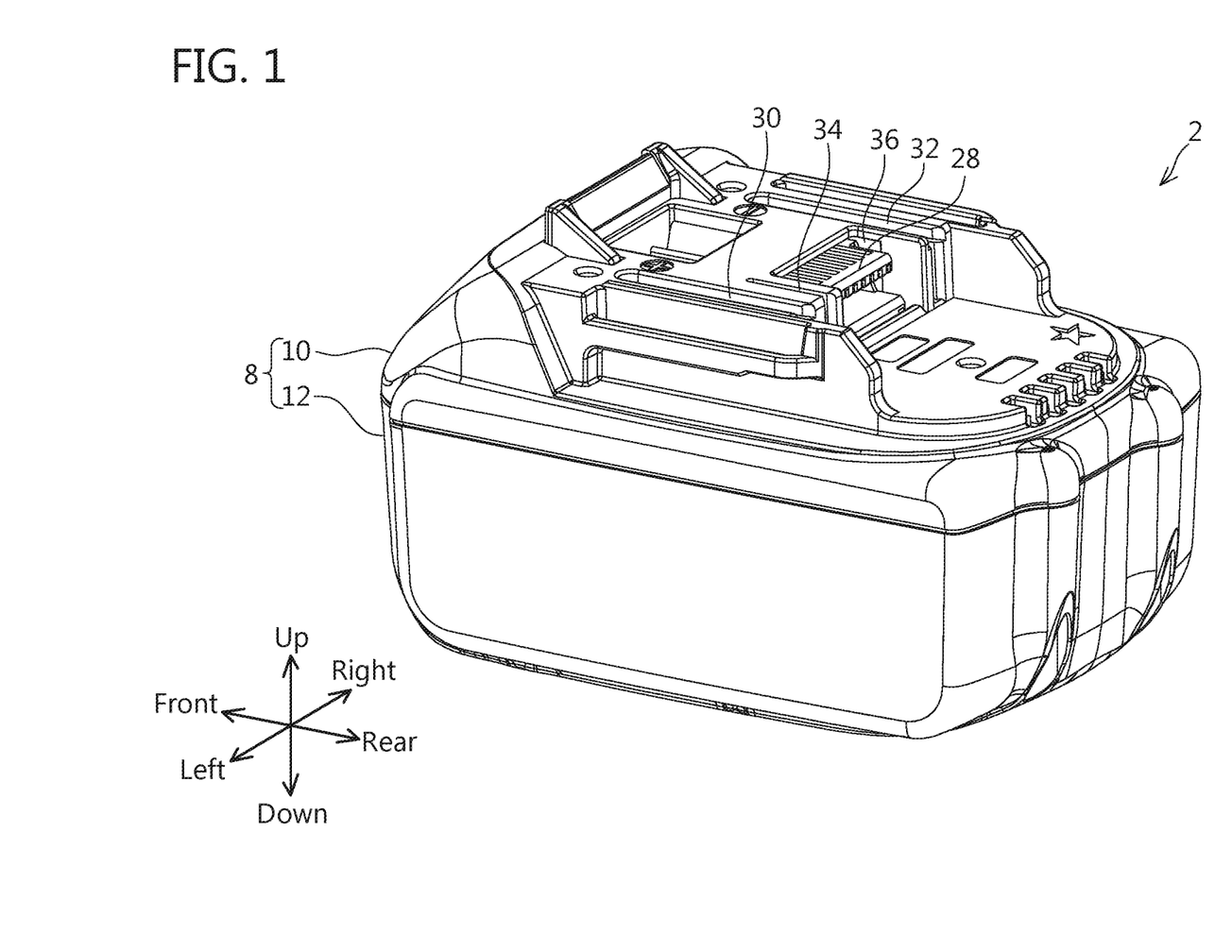
FIG. 1 is a perspective view of a battery pack according to an embodiment of the present teachings.

The discharge positive terminal 20 is disposed inside a first opening 30 formed in an upper surface of the upper case 10 shown in FIG. 1. The charging/discharge negative terminal 22 is disposed inside a second opening 32 formed in the upper surface of the upper case 10. The charging positive terminal 24 and the discharge inhibition signal terminal 26 are disposed so to be aligned in the frontward-rearward direction inside a third opening 34 formed in the upper surface of the upper case 10. The charge control signal terminal 28 is exposed to the outside through a fourth opening 36 formed in the upper surface of the upper case 10.

As shown in FIGS. 2 and 3, the electric power tool 4 includes a battery attachment portion 38 to which the battery pack 2 is attached. As shown in FIG. 3, the battery attachment portion 38 of the electric power tool 4 is provided with a rectangular, flat plate-like, positive terminal 40 and a rectangular, flat plate-like, negative terminal 42, which extend in parallel in the frontward-rearward direction and in the upward-downward direction. An L-shaped, flat plate-like, signal terminal 44 also extends in the frontward-rearward directions and in the upward-downward direction. The signal terminal 44 includes a long-side portion, a longitudinal direction of which extends in the frontward-rearward direction, and a short-side portion extending from the long-side portion such that its longitudinal direction extends in the upward-downward direction. It is noted that, when the electric power tool 4 is completed as a final product, the long-side portion of the signal terminal 44 is covered by resin, and only the short-side portion of the signal terminal 44 is exposed. Both the positive terminal 40 and the negative terminal 42 have a chamfered corner at their forward edge. The short-side portion of the signal terminal 44 has chamfered corners at both its forward and rearward edge.

When the battery pack 2 is to be attached to the electric power tool 4, the battery pack 2 is slid rearward against the electric power tool 4, thereby causing the positive terminal 40, the negative terminal 42, and the signal terminal 44 of the electric power tool 4 to enter the first, second, and third openings 30, 32, and 34 of the battery pack 2, respectively, and engage with the discharge positive terminal 20, the charging/discharge negative terminal 22, and the discharge inhibition signal terminal 26, respectively, to be in electrical conduction therewith. When the battery pack 2 is to be detached from the electric power tool 4, the battery pack 2 is slid frontward against the electric power tool 4, thereby causing the positive terminal 40, the negative terminal 42, and the signal terminal 44 of the electric power tool 4 to disengage from the discharge positive terminal 20, the charging/discharge negative terminal 22, and the discharge inhibition signal terminal 26, and exit the first, second, and third openings 30, 32, and 34 of the battery pack 2, respectively.

Similarly, although not shown, the charger also includes a battery attachment portion to which the battery pack 2 is attached. The battery attachment portion of the charger is provided with rectangular, flat plate-like, positive and negative terminals, which both extend in the frontward-rearward and upward-downward directions, and a signal terminal.

When the battery pack 2 is to be attached to the charger, the battery pack 2 is slid rearward against the charger, thereby causing the negative terminal and the positive terminal of the charger to enter the second and third openings 32 and 34, respectively, and engage with the charging/discharge negative terminal 22 and the charging positive terminal 24, respectively, to be in electrical conduction therewith, and additionally, causing the signal terminal of the charger to engage with the charge control signal terminal 28 of the battery pack 2. When the battery pack 2 is to be detached from the charger, the battery pack 2 is slid frontward, thereby causing the negative terminal and the positive terminal of the charger to be disengaged from the charging/discharge negative terminal 22 and the charging positive terminal 24, and be slipped off from the second and third openings 32 and 34, and additionally, causing the signal terminal of the charger to be disengaged from the charge control signal terminal 28.

As was explained above, the entire surface of the lead plate 18b, and a portion of the battery cell case 14 adjacent to the lead plate 18b are covered by the electric insulation paper 17a (see FIG. 4). On the other hand, the surfaces of the two lead plates 18a and 18c adjacent to the lead plate 18b are not covered by the electric insulation paper 17a. Because the lead plates 18a to 18c are arranged (disposed) so as to be physically separated from each other, the lead plates 18a and 18b are isolated (insulated) from each other, and the lead plates 18b and 18c are also isolated (insulated) from each other. In the prior art battery pack described above in the background section, one continuous piece of insulating paper is adhered to the plurality of lead plates (connection tabs) straddling the gaps between the lead plates 18a to 18c. Thus, in the above-described known design, the insulation paper is prone to peel off at the gaps between the lead plates. On the other hand, in the present embodiment, the electric insulation paper 17a is adhered to only the middle lead plate 18b and a portion of the battery cell case 14 adjacent to (surrounding) the lead plate 18b, and does not adhere to other lead plates 18a and 18c in a manner that straddles the gaps 19a. Accordingly, the electric insulation paper 17a can appropriately (more reliably or durably) be adhered to the lead plate 18b and a portion of the battery cell case 14 adjacent to the lead plate 18b. Therefore, as compared the above-described known design, in which one continuous sheet of insulation paper is adhered to all of the lead plates on one side of the battery module, the present design reduces the likelihood that the electric insulation paper 17a will peel off. Moreover, in the present embodiment, the lead plate 18b is approximately flush with each of the gaps 19a. Accordingly, as compared the above-described known design, in which the lead plate has a height different from the height of each gap, the electric insulation paper 17a can appropriately (more reliably and durably) adhere to the lead plate 18b in the present embodiment. Accordingly, the electric insulation paper 17a of the present embodiment can more durably or reliably block any water, foreign matter, etc. from contacting the lead plate 18b. Therefore, even if water, foreign matter, etc. enters into the battery pack 2, the lead plates 18a and 18b, and the lead plates 18b and 18c can be maintained insulated from each other in a more reliable or durable manner. Consequently, it is possible to prevent or reduce the likelihood of a short circuit between the lead plates 18a and 18b, or between the lead plates 18b and 18c, if water, foreign matter, etc. is present inside the battery pack 2, over the service life of the battery pack 2.

Moreover, the electric insulation paper 17a is adhered to a portion of the battery cell case 14 adjacent to (surrounding) the lead plate 18b. In other words, the electric insulation paper 17a is adhered to the battery cell case 14 beyond the outer edges of the surface of the lead plate 18b. According to this design, even if a portion of the electric insulation paper 17a that is adhered to the battery cell case 14 peels off, the entire lead plate 18b remains covered by the electric insulation paper 17a such that any water, foreign matter, etc. inside the battery pack 2 will not contact the lead plate 18b, thereby preventing short-circuits.

Moreover, the electric insulation paper 17a only adheres to the lead plate 18b, and hence, as compared a known design in which one continuous sheet of insulating paper is adhered to all of the plurality of lead plates 18a to 18c, the amount of electric insulation paper 17a to be used can be reduced. Moreover, compared the above-described known design, the amount of time required to the electric insulation paper 17a during assembly of the battery module 6 can be reduced.

Of course, the electric insulation paper 17b adhered to the lead plate 18e on the other side of the battery module 6 (see FIG. 6) also achieves the same insulating effect as the electric insulation paper 17a, whereby water, foreign matter, etc. are blocked from contacting the lead plate 18e and short-circuits between adjacent lead plates 18d-f are prevented.

It is noted that each of the electric insulation papers 17a and 17b serves as one representative example of a "first insulation sheet" according to the present teachings. Each of the lead plates 18a and 18d serves as one representative example of a "second lead plate" according to the present teachings. Each of the lead plates 18c and 18f serves as one representative example of a "third lead plate" according to the present teachings. Furthermore, each of the lead plates 18b and 18e serves as one representative example of a "first lead plate" according to the present teachings.

While specific examples of the present invention have been described above in detail, these examples are merely illustrative and place no limitation on the scope of the patent claims. The technical subject matter described in the patent claims also encompasses various changes and modifications to the specific examples described above.

VARIATION 1

Figure 7:
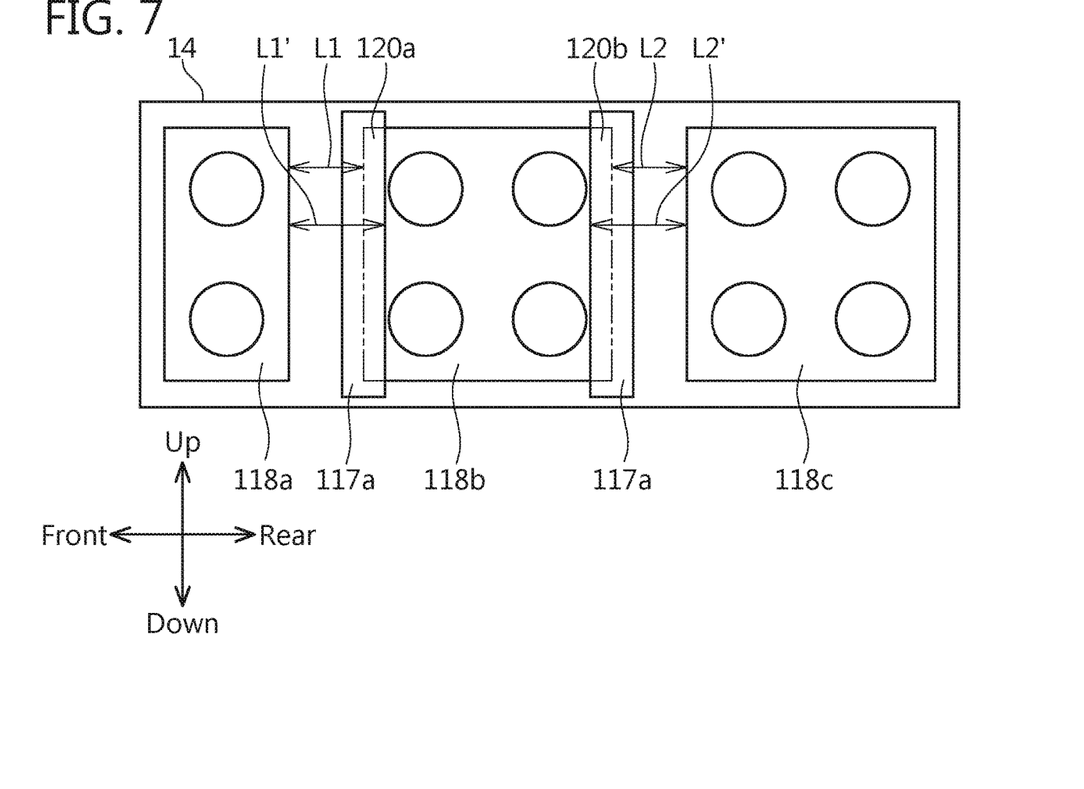
FIG. 7 is a schematic view of a first variation (Variation 1) of a battery module according to the present teachings.

In the above-described embodiment of the present teachings, the electric insulation paper 17a covers the entire surface of the lead plate 18b. As shown in FIG. 7, however, electric insulation paper(s) 117a may cover only the end(s) or edge portion(s) of lead plate 118b. For example, one piece of electric insulation paper 117a may be adhered onto the surface of the lead plate 118b at one end (front edge) 120a on a side adjacent to lead plate 118a, and another piece of electric insulation paper 117a may be adhered to another end (rear edge) 120b on the opposite side adjacent to lead plate 118c. In this embodiment (Variation 1) as well, no electric insulation paper is adhered to the lead plates 118a and 118c. Accordingly, similar to the electric insulation paper 17a shown in FIG. 4, the two pieces of electric insulation paper 117a can be appropriately (reliably or durably) adhered to each of the ends (edge portions) 120a and 120b of the lead plate 118b, and the adjacent surface of the battery cell case 14. Moreover, because the end 120a of the lead plate 118b is covered by the electric insulation paper 117a, the separation distance between an exposed portion of the lead plate 118a and an exposed portion of the lead plate 118b can be increased. It is noted that the term "exposed portion" refers to a portion of the surface of each of the lead plates 118a to 118c that is not covered by the electric insulation paper 117a. Specifically, as shown in FIG. 7, the end (front edge) 120a of the lead plate 118b is covered by one piece of the electric insulation paper 117a, thereby increasing the separation distance from L1 to L1'. Therefore, by increasing the separation distance between the exposed portions of the lead plates 118a and 118b, it is possible to prevent or reduce the likelihood of a short circuit between the lead plates 118a and 118b in case any water, foreign matter, etc. is present within the battery pack 2. Moreover, because the end (rear edge) 120b of the lead plate 118b also is covered by another piece of the electric insulation paper 117a, the separation distance between the exposed portion of the lead plate 118c and the exposed portion of the lead plate 118b also can be increased from L2 to L2', thereby preventing or reducing the likelihood of a short circuit between the lead plates 118b and 118c in case any water, foreign matter, etc. is present in the battery pack 2. It is noted that the lead plate 118b serves as another representative example of a "first lead plate" according to the present teachings, and each of the lead plates 118a and 118c serve as additional representative examples of a "second lead plate" according to the present teachings.

VARIATION 2

Figure 8:
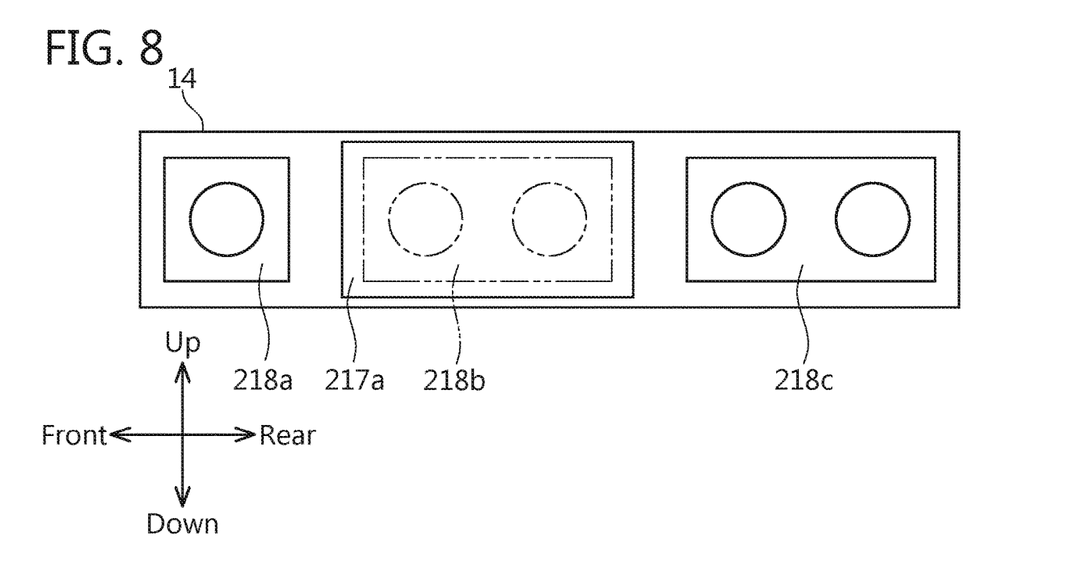
FIG. 8 is a schematic view of a second variation (Variation 2) of a battery module according to the present teachings.

In the above-described embodiments, the battery cells 15 are arranged in two tiers in the upward-downward direction. However, the battery cells 15 may be arranged in one tier in the upward-downward direction. As shown in FIG. 8, if the battery cells 15 are arranged in one tier, the battery cells 15 may be electrically connected in series by a plurality of lead plates 218a, 218b, and 218c. In this embodiment (Variation 2), on the left side surface of the battery cell case 14, one continuous sheet of electric insulation paper 217a is adhered to the entire surface of the lead plate 218b, and to portions of the battery cell case 14 that surround the lead plate 218b in the front, up, rear and down directions. Thus, similar to the embodiments above, the lead plate 218b is effectively insulated from the lead plate 218a on the front side and from the lead plate 218c on the rear side, thereby preventing or reducing the likelihood of a short circuit between the lead plates 218a and 218b, and between the lead plates 218b and 218c, if any water, foreign matter, etc. is present inside the battery pack 2.

VARIATION 3

Figure 9:
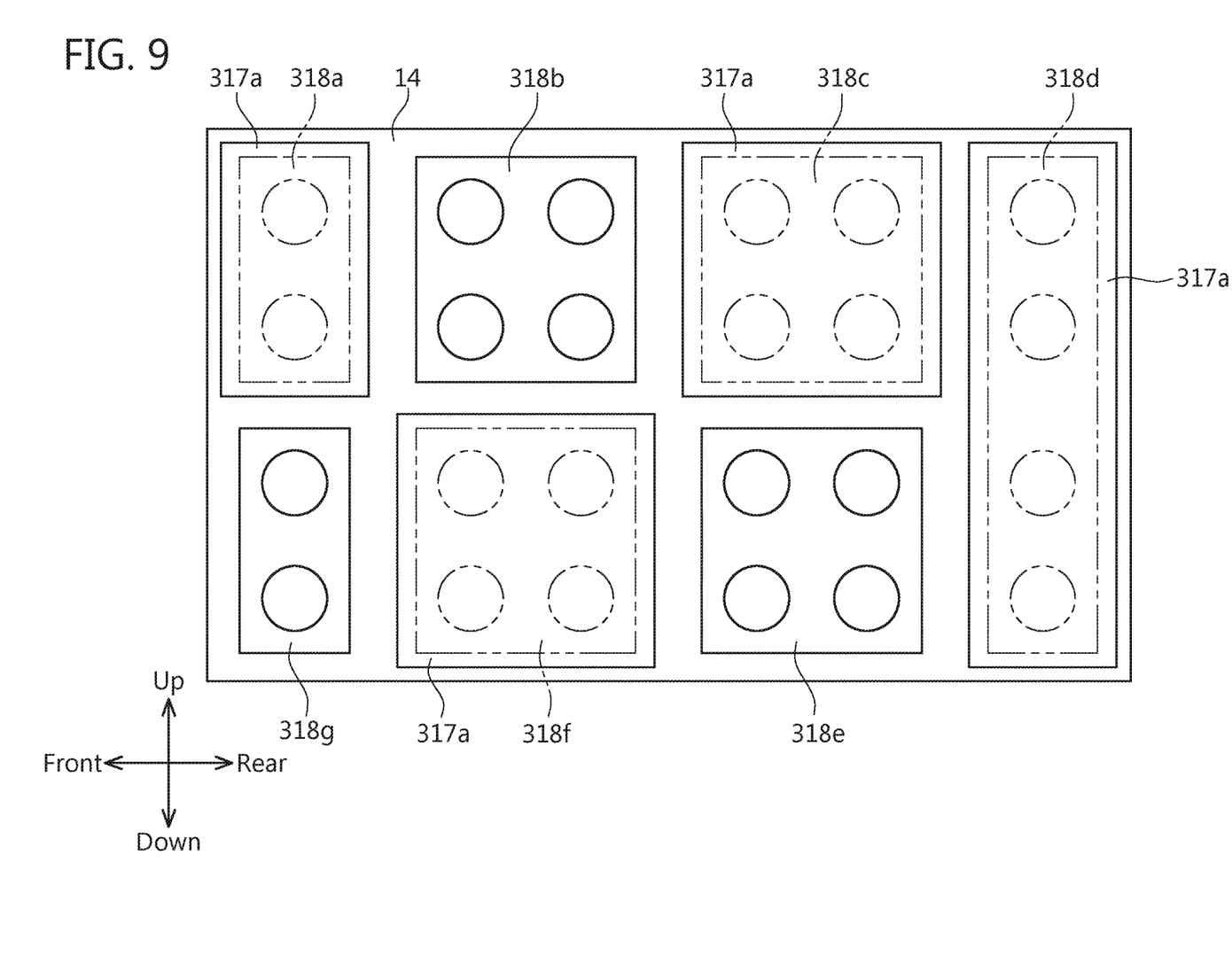
FIG. 9 is a schematic view of a third variation (Variation 3) of a battery module according to the present teachings.

In the above-described embodiments, the lead plates 18a-f, 118a-c and 218a-c are each arranged in one tier in the upward-downward direction. However, as shown in FIG. 9, a plurality of lead plates 318a to 318g may be arranged in two tiers in the upward-downward direction. In this embodiment (Variation 3), on the left side surface of the battery cell case 14, individual (discrete) sheets (pieces) of electric insulation paper 317a may be respectively adhered to each of the lead plates 318a, 318c, 318d, and 318f. Each sheet of electric insulation paper 317a insulates the lead plate that it covers from the adjacent lead plates. For example, a sheet of electric insulation paper 317a insulates the lead plate 318f from the surrounding (adjacent) lead plates 318b, 318e, and 318g even though these lead plates 318b, 318e, and 318g are not covered by an electric insulation sheet. It is therefore possible to prevent or reduce the likelihood of a short circuit between adjacent lead plates in case any water, foreign matter, etc. is present inside the battery pack 2.

VARIATION 4

In the above-described embodiments, the battery cells 15 are arranged such that the longitudinal axis of each of the battery cells 15 is oriented in the leftward-rightward direction. However, the battery cells 15 may instead be arranged such that the longitudinal axis of each of the battery cells 15 is oriented in the frontward-rearward direction. In such an embodiment, the lead plates 18a to 18f are disposed on a front surface side and/or on a rear surface side of the battery cell case 14.

VARIATION 5

Figure 10:
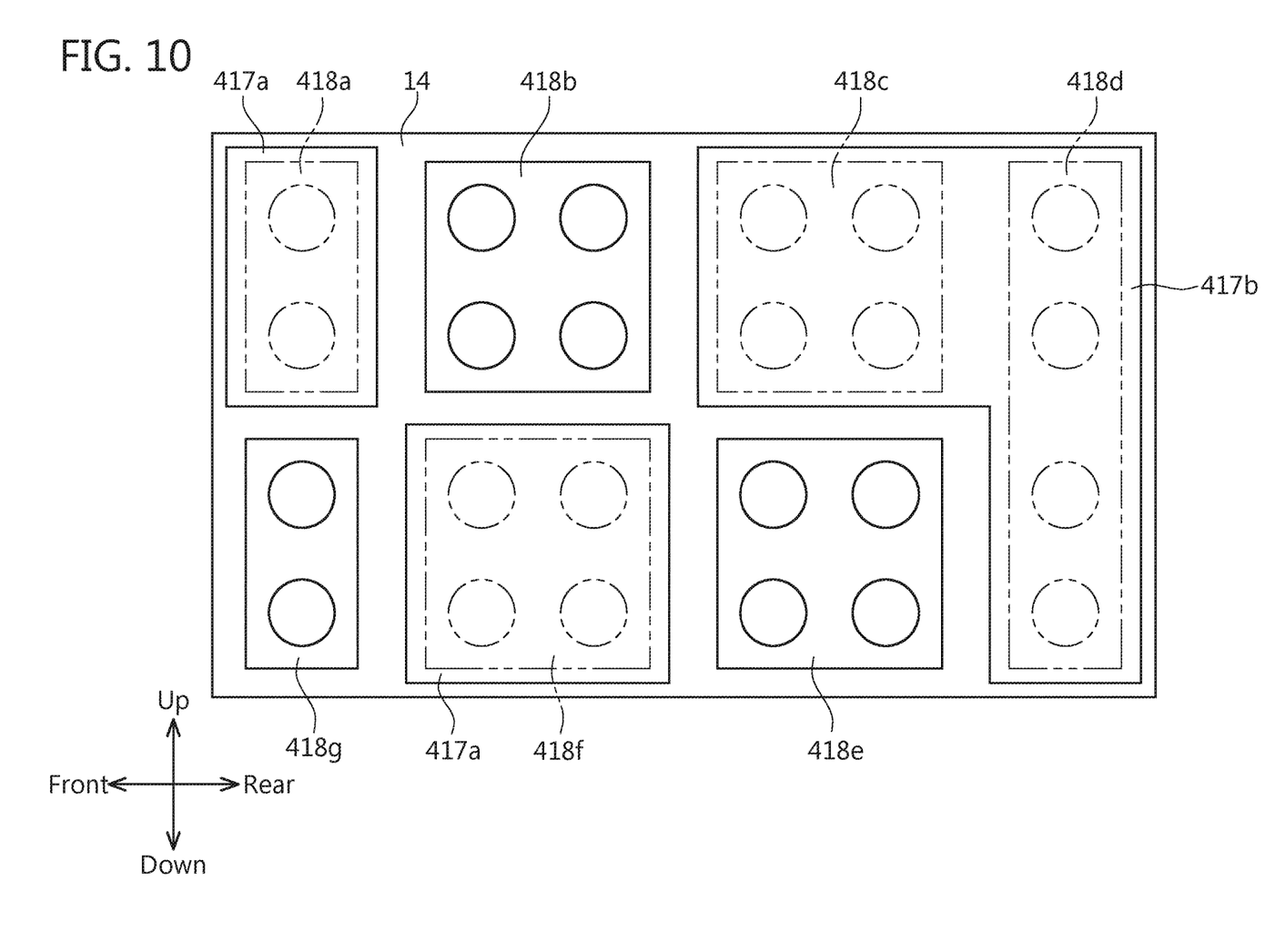
FIG. 10 is a schematic view of a fifth variation (Variation 5) of a battery module according to the present teachings.

In each of the preceding embodiments (variations), one sheet (piece) of electric insulation paper 17a, 17b, 117a, 217a, 317a is adhered to the surface of only one lead plate. However, as shown in FIG. 10, it is possible to provide a battery pack 2, in which some sheets (pieces) of electric insulation paper 417a are adhered to the surface of only one lead plate 418, and at least one sheet of electric insulation paper 417b is adhered to the surfaces of two or more lead plates 418 in a straddling manner. In FIG. 10, individual (discrete) sheets of electric insulation paper 417a are adhered to the surfaces of the lead plates 418a and 418f, respectively, while one continuous sheet of electric insulation paper 417b is adhered to the surfaces of both the lead plates 418c and 418d in a straddling manner. It is noted that it is advisable that the electric insulation paper 417b be adhered, in a straddling manner, to the surfaces of two or lead plates 418 that are less likely to cause a short circuit. Moreover, one continuous sheet of the electric insulation paper 417b may also be adhered to the surfaces of three or more lead plates 418 in a straddling manner.

VARIATION 6

Figure 11:
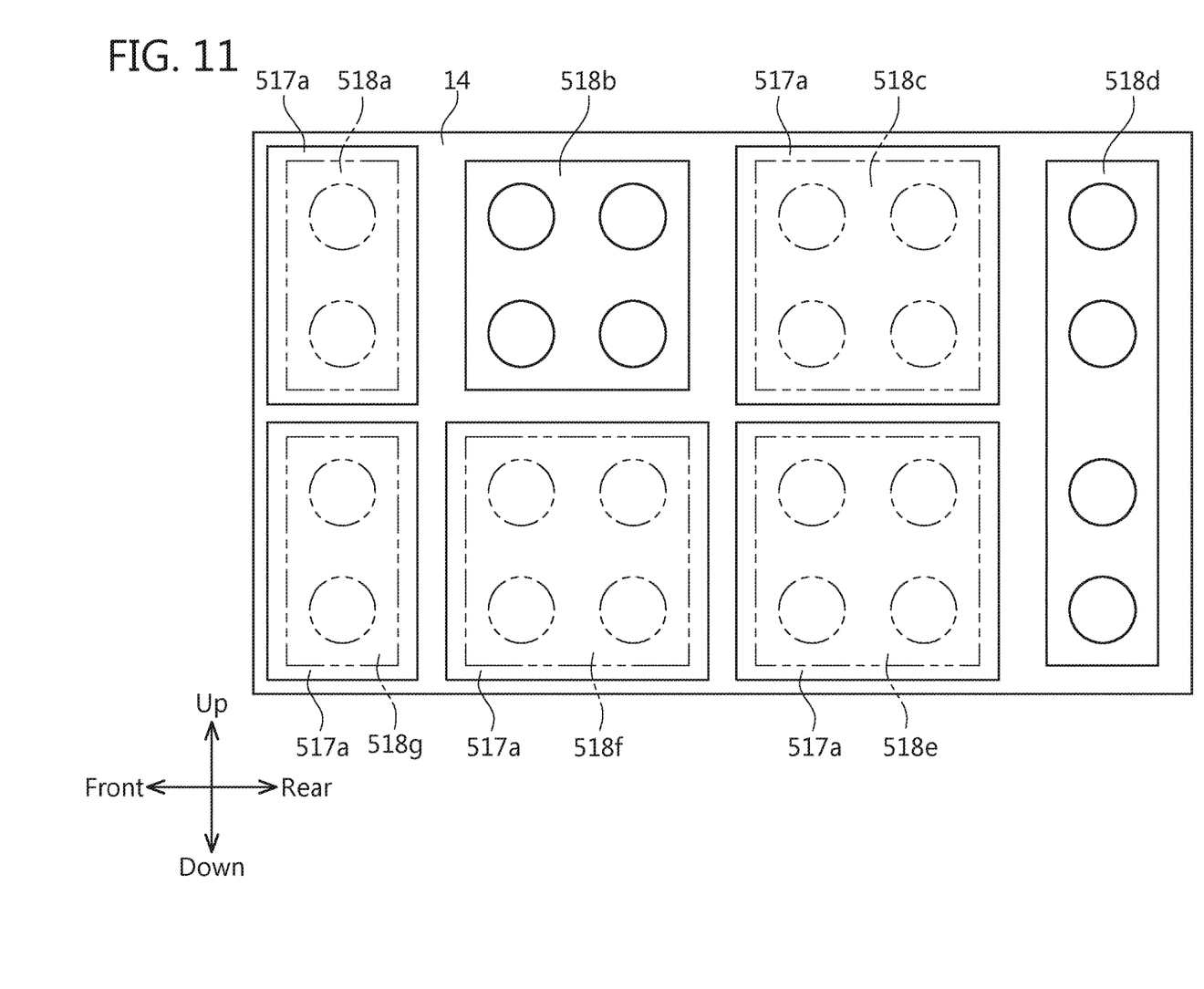
FIG. 11 is a schematic view of a sixth variation (Variation 6) of a battery module according to the present teachings.

In a further variation of the above-described embodiments shown in FIG. 11, lead plates 518a to 518g are arranged so to be physically or spatially separated (isolated) from each other in two tiers in the upward-downward direction, and individual (discrete) sheets of electric insulation paper 517a may be adhered to only the lead plates 518a, 518c, 518e, 518f, and 518g. It is noted that the expression "a plurality of lead plates 518 arranged so to be physically or spatially separated (isolated) from each other" is intended to include separation in the frontward-rearward direction, in the upward-downward direction, and also in oblique (diagonal) directions. For example, the lead plates 518b and 518e serve as a representative example of two lead plates 518 that are arranged to be separated from each other in an oblique direction.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A battery pack comprising:
   a battery cell case;
   a plurality of battery cells accommodated in the battery cell case;
   a first lead plate physically connected to a first subset of the plurality of battery cells;
   a second lead plate adjacent to the first lead plate and physically connected a second subset of the plurality of battery cells, the first and second lead plates being arranged on a same side surface of the battery cell case, and the first and second lead plates being separated from each other; and
   one or more insulation sheets,
   wherein:
   a first surface of a first insulation sheet included in the one or more insulation sheets adheres to a first surface of the first lead plate so as to cover the first surface of the first lead plate at least partially and not to cover lead plates other than the first lead plate,
   the first surface of the first insulation sheet adheres to a surface of the battery cell case,
   the second lead plate is not covered by any of the one or more insulation sheets, and
   an end of the first surface of the first lead plate on a side adjacent to the second lead plate is at least partially covered by the first insulation sheet.

2. The battery pack according to claim 1, wherein the first surface of the first lead plate is only partially covered by the first insulation sheet.

3. The battery pack according to claim 1, further comprising a third lead plate adjacent to the first lead plate,
   wherein:
   the first lead plate is arranged between the second lead plate and the third lead plate,
   the third lead plate is not covered by any of the one or more insulation sheets, and
   the first surface of the first lead plate is entirely covered by the first insulation sheet.

4. A battery pack comprising:
   a battery cell holder;
   first and second battery cells retained by the battery cell holder, each of the first and second battery cells having an electrode at an end surface;
   a first lead plate electrically and physically connected to the electrode of the first battery cell;
   a second lead plate electrically and physically connected to the electrode of the second battery cell, the first and second lead plates being disposed on a same side surface of the battery cell holder but physically separated from each other; and
   a first insulation sheet covering at least a first edge portion of the first lead plate that is adjacent to the second lead plate and not covering or contacting the second lead plate;
   wherein:
   a first surface of the first insulation sheet adheres to the first lead plate and adheres to a first portion of a surface of the battery cell holder that is adjacent to the first edge portion, and
   the first insulation sheet only partially covers the first lead plate such that a portion of an outer surface of the first lead plate is exposed.

5. The battery pack according to claim 4, wherein the first portion of the surface of the battery cell holder is disposed between the first lead plate and the second lead plate.

6. The battery pack according to claim 4, wherein the first, and second lead plates are fitted within recesses in the battery cell holder such that outer surfaces of the first, and second lead plates are flush with the surface of the battery cell holder.

7. The battery pack according to claim 4, further comprising:
   a third battery cell retained by the battery cell holder; and
   a third lead plate electrically connected to the third battery cell, the third lead plate being disposed on the same side surface of the battery cell holder as the first and second lead plates but physically separated from the first and second lead plates;
   wherein:
   the first surface of the first insulation sheet also adheres to at least a second edge portion of the first lead plate that is adjacent to the third lead plate and not covering or contacting the third lead plate, and
   the first lead plate is disposed between the second lead plate and the third lead plate.

8. The battery pack according to claim 7, wherein the first surface of the first insulation sheet also adheres to a second portion of a surface of the battery cell holder that is adjacent to the second edge portion, the second portion of the surface of the battery cell holder being disposed between the first lead plate and the third lead plate.

9. The battery pack according to claim 8, wherein the first, second and third lead plates are fitted within recesses in the battery cell holder such that outer surfaces of the first, second and third lead plates are flush with the surface of the battery cell holder.

10. The battery pack according to claim 9, wherein a central portion of the outer surface of the first lead plate between the first edge portion and the second edge portion is not covered by the first insulation sheet and is thus exposed.

11. A battery pack comprising:
a battery cell case;
first and second battery cells accommodated in the battery cell case, each of the first and second battery cells having a longitudinal axis extending through an electrode on an end surface of the battery cell;
a first lead plate having an inner side in electrical and physical contact with the electrode of the first battery cell and arranged such that an extension of the longitudinal axis of the first battery cell passes through the first lead plate;
a second lead plate spaced from the first lead plate and arranged on a same side surface of the battery cell case as the first lead plate, the second lead plate having an inner side in electrical and physical contact with the electrode of the second battery cell and being arranged such that an extension of the longitudinal axis of the second battery cell passes through the second lead plate; and
one or more insulation sheets,
wherein the first lead plate is fitted within a first recess in the battery cell case such that an outer surface of the first lead plate is flush with the surface of the battery cell case, and
a first insulation sheet included in the one or more insulation sheets adheres to the outer surface of the first lead plate so as to cover the outer surface of the first lead plate at least partially and not to cover the second lead plate and also adheres to a first portion of the battery cell case adjacent to the first recess.

12. The battery pack according to claim 11, wherein the extensions of the longitudinal axes of the battery cells are substantially perpendicular to the outer surface of the first lead plate.

13. The battery pack according to claim 11, wherein:
the first portion of the battery cell case is located on a first side of the first recess and a second portion of the battery cell case is located on a second side of the first recess that is opposite the first side of the first recess, and
a second insulation sheet included in the one or more insulation sheets adheres to the outer surface of the first lead plate and to the second portion of the battery cell case.

14. The battery pack according to claim 11, wherein the first insulation sheet overlies a joint between the first lead plate and the battery cell case.

15. The battery pack according to claim 11, wherein a first side of the first insulation sheet adheres to the first lead plate and to the first portion of the battery cell case.

16. A battery pack comprising:
a battery cell case;
a plurality of battery cells accommodated in the battery cell case;
a first lead plate physically connected to a first subset of the plurality of battery cells;
a second lead plate physically connected to a second subset of the plurality of battery cells, the first and second lead plates being arranged on a same side surface of the battery cell case, and the first lead plate being separated from the second lead plate; and
one or more insulation sheets,
wherein:
a first surface of a first insulation sheet included in the one or more insulation sheets adheres to a first surface of the first lead plate so as to cover the first surface of the first lead plate at least partially and not to cover lead plates other than the first lead plate,
the first surface of the first insulation sheet adheres to a surface of the battery cell case,
the battery cell case includes a first recess and a second recess that is separate from the first recess,
the first lead plate is mounted in the first recess,
the second lead plate is mounted in the second recess, and
the first insulation sheet overlies a joint between the first lead plate and a portion of the battery cell case adjacent to the first recess.

17. A battery pack comprising:
a battery cell holder;
first and second battery cells retained by the battery cell holder, each of the first and second battery cells having an electrode at an end surface;
a first lead plate electrically and physically connected to the electrode of the first battery cell;
a second lead plate electrically and physically connected to the electrode of the second battery cell, the first and second lead plates being disposed on a same side surface of the battery cell holder but physically separated from each other; and
a first insulation sheet covering at least a first edge portion of the first lead plate that is adjacent to the second lead plate and not covering or contacting the second lead plate;
wherein:
a first surface of the first insulation sheet adheres to the first lead plate and adheres to a first portion of a surface of the battery cell holder that is adjacent to the first edge portion,
the first and second lead plates are fitted within recesses in the battery cell holder such that outer surfaces of the first, and second lead plates are flush with the surface of the battery cell holder, and
the first insulation sheet overlies a joint between the first lead plate and a portion of the battery cell holder adjacent the first lead plate.

18. The battery pack according to claim 17, wherein the first insulation sheet entirely covers one surface of the first lead plate.

19. The battery pack according to claim 18, wherein the first portion of the surface of the battery cell holder is disposed between the first lead plate and the second lead plate.

20. The battery pack according to claim 17, further comprising:
a third battery cell retained by the battery cell holder; and
a third lead plate electrically connected to the third battery cell, the third lead plate being disposed on the same side surface of the battery cell holder as the first and second lead plates but physically separated from the first and second lead plates;
wherein:
the first surface of the first insulation sheet also adheres to at least a second edge portion of the first lead plate that is adjacent to the third lead plate and not covering or contacting the third lead plate, and the first lead plate is disposed between the second lead plate and the third lead plate.

21. The battery pack according to claim 20, wherein the first surface of the first insulation sheet also adheres to a second portion of a surface of the battery cell holder that is adjacent to the second edge portion, the second portion of the surface of the battery cell holder being disposed between the first lead plate and the third lead plate.

22. The battery pack according to claim 21, wherein the first, second and third lead plates are fitted within recesses in the battery cell holder such that outer surfaces of the first, second and third lead plates are flush with the surface of the battery cell holder.

23. The battery pack according to claim 22, wherein a central portion of the outer surface of the first lead plate between the first edge portion and the second edge portion is not covered by the first insulation sheet and is thus exposed.

\* \* \* \* \*